May 6, 1941.  W. R. GRISWOLD  2,241,087
MOTOR VEHICLE
Filed July 12, 1940
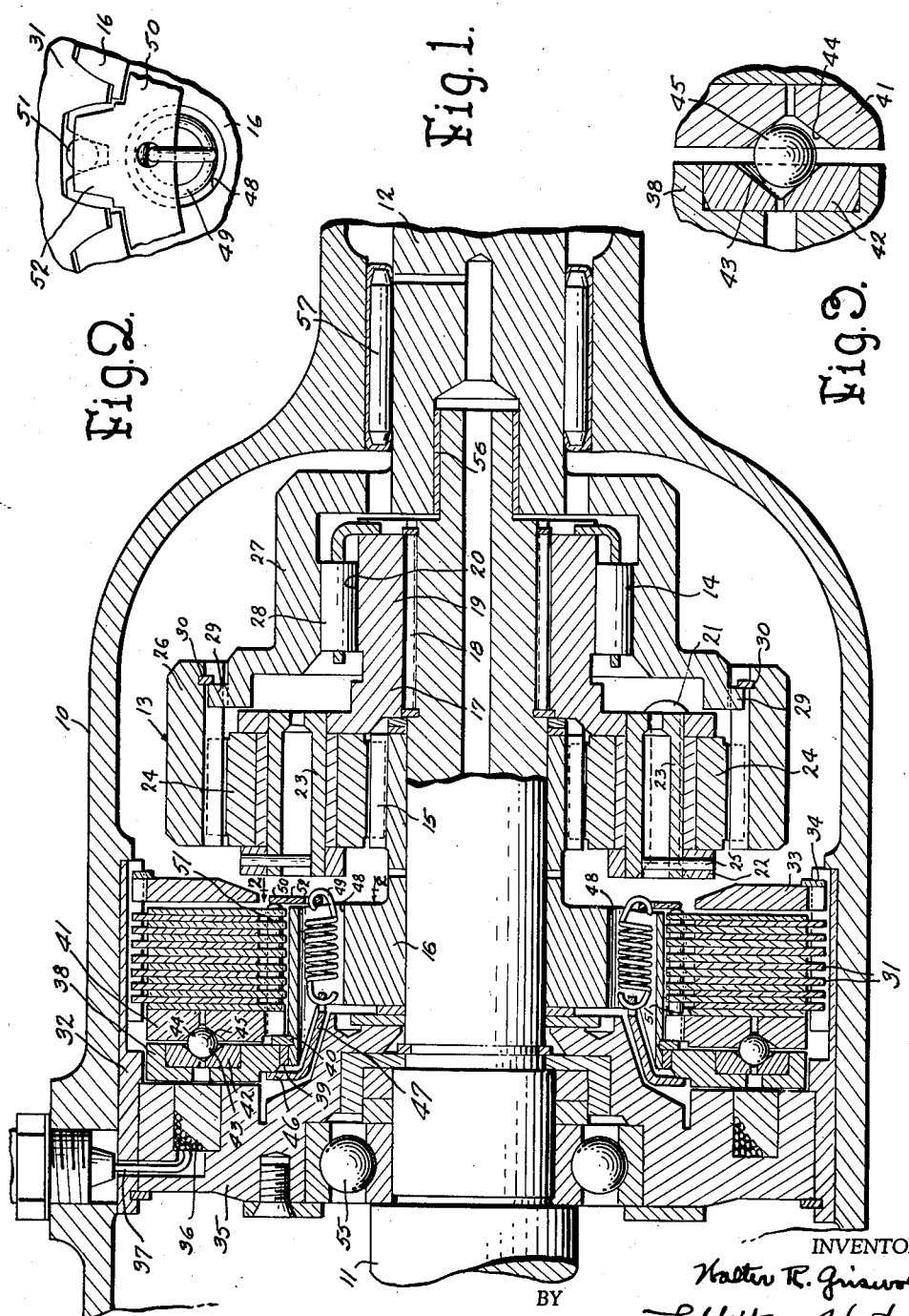
INVENTOR.
Walter R. Griswold
BY Sibbett & Hart
Attorneys Patented May 6, 1941

2,241,087

UNITED STATES PATENT OFFICE 2,241,087

MOTOR VEHICLE

Walter R. Griswold, Detroit, Mich., assignor to Packard Motor Car Company, Detroit, Mich., a corporation of Michigan Application July 12, 1940, Serial No. 345,062

5 Claims. (Cl. 74—290)

This invention relates to drive mechanism for motor vehicles and more particularly to change speed mechanism.

An object of the invention is to provide a brake control for planetary gearing in a drive mechanism by means of which a modified drive through the planetary gearing can be established quickly and without a physical burden upon the driver.

Another object of the invention is to provide a control mechanism for a motor vehicle planetary drive gearing in which servo mechanism can be readily operated and released.

Still another object of the invention is to provide a servo actuated control for planetary gearing in a motor vehicle drive mechanism that will respond quickly and forcefully to effect a modified drive.

Other objects of the invention will appear from the following description taken in connection with the drawing, which forms a part of this specification, and in which:

Fig. 1 is a fragmentary sectional view of drive mechanism incorporating the invention;

Fig. 2 is a fragmentary end view of the brake mechanism taken substantially on line 2—2 of Fig. 1;

Fig. 3 is an enlarged fragmentary view of the servo mechanism in brake applying position.

In the drawing, motor vehicle drive mechanism is arranged in a casing 10 and consists generally of a drive shaft 11 and a driven shaft 12 that can be connected by a planetary gearing 13 and by a one-way overrunning clutch 14. The drive shaft can be connected to be driven directly by a power plant or it can be driven from a power plant at a plurality of speeds.

The planetary gearing consists of a sun gear 15 loosely mounted on the drive shaft and having a forwardly extending splined portion 16. Carrier 17 is splined at 18 to the drive shaft and has a hub extension 19 formed with a plurality of cam surfaces 20. Fixed to the forward end of the carrier by suitable fastening means, such as rivets 21, is a carrier ring 22 and this ring and the carrier provide a mounting for shafts 23 on which planet pinions 24 are loosely mounted. The shafts 23 are fixed to the carrier ring by pins as indicated at 25. The planetary gearing also includes a ring gear 26 and the planet gears mesh with the ring gear and with the sun gear. The driven shaft 12 has an enlarged hollow forward end 27 that telescopes and is spaced from the cam surfaces 20 on the carrier extension hub, and between such cam surfaces and the adjacent inner periphery of the enlarged extensions are arranged rollers 28. These rollers act to provide a one-way overrunning driving connection between the carrier and the driven shaft whereby there will be a direct drive from the drive shaft to the driven shaft due to the keyed connection of the carrier with the drive shaft. The forward end of the driven shaft extension 27 is formed with teeth 29 that mesh with the teeth of the planetary ring gear 26 and are so retained by a snap ring 30.

Control mechanism is provided to establish or release the drive through the planetary gearing. Such mechanism consists of a brake mechanism for locking the sun gear to the casing when it is desired to provide a modified drive from the drive shaft to the driven shaft through the planetary gearing. When the brake mechanism is free and the planetary gearing idles, then the drive is through the overrunning clutch.

In the mechanism for controlling the planetary gearing there is a series of axially slidable brake plates 31 in advance of the planetary gearing and alternately splined to the sun gear extension 16 and to a brake sleeve 32 fixed within the casing. A backing plate 33 is splined to the brake sleeve 32 and is maintained against axial displacement by a snap ring 34. In advance of the brake plates and secured in the casing is a magnet 35 having a winding 36 therein which can be energized in a suitable manner and under a suitable control by means of a conductor 37.

Adjacent the magnet is arranged an armature 38 axially movable and rotatably mounted on a bearing 39 fixed on the forward end of the sun gear extension. Rearward movement of the armature is limited by a snap ring 40 seated in a recess in the sun gear extension. Between the series of brake plates and the armature is a pressure member 41 that is movable in an axial direction and splined to the sun gear extension. The face of the magnet adjacent the pressure member is formed with recesses for receiving hardened inserts 42 in which are formed conical recesses 43 that register with conical recesses 44 in the adjacent face of the pressure member. These registering recesses receive balls 45 and form therewith servo means for applying the brake to hold the sun gear stationary with the casing when the magnet is energized holding the armature stationary therewith, as shown in Fig. 3.

The balls are normally centered in the recesses by yieldable means acting to hold the armature and the pressure member in their closest relationship, and thus when the magnet is not energized such yieldable means will release the brake mechanism so that the sun gear is free to rotate. An anchor ring 46 engages the front surface of the armature and is provided with a plurality of fingers 47 that project rearwardly into openings 48 extending through the sun gear extension. Coil springs 49 are anchored at their forward ends to these fingers 47 and such springs extend through the openings 48 and engage at their rear ends an anchor ring member 50. Pins 51 bear at their forward ends against the rear face of the pressure plate 41 and at their rear ends against the front face of the member 50. These pins lie in recesses between splines of the sun gear extension, and the splines of the brake plates normally entering such recesses are eliminated. The ring 50 is formed with radially extending peripheral projections 52 that register with the pins 51 for engagement thereby. The anchor member 46 engages the front surface of the armature and the pins bear against the rear surface of the pressure member and the springs 49 engaging the fingers 47 and the ring 50 act through the associated mechanism to normally urge the pressure member into its closest relationship with the armature, that is, in a forward position whereby the brake plates are released from frictional engagement when the armature is free from the magnet so that the servo balls will center in the conical recesses.

The drive shaft 11 is suitably mounted in a bearing 55 carried by the magnet 35 and by a bearing 56. The driven shaft is mounted in a bearing 57 carried by the casing 10.

The planetary gearing can be arranged to provide an underdrive or an overdrive depending upon the tooth arrangement. The planetary gearing serves to drive only when the brake is applied fixing the sun gear with the casing. Whenever the brake mechanism is released then the drive is direct from shaft 11 to shaft 12 through the overrunning one-way roller clutch 14. The servo mechanism is automatically operated by the electrical system to quickly and positively move the pressure member rearwardly forcing the brake members into frictional engagement and against the backing member 33. This arrangement of drive mechanism and its control lends itself to accommodation within a space of relatively small diameter that can be readily arranged beneath the floor board of a motor vehicle.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In drive mechanism having a casing, drive and driven shafts in the casing and planetary gearing in the casing having a ring gear fixed to rotate with one shaft and a planet carrier fixed to rotate with the other shaft and a sun gear, control means for establishing drive through the planetary gearing comprising a series of axially shiftable friction brake plates alternately splined to the planetary gearing sun gear and to the casing, a backing member splined to the casing at one end of the series of plates, an axially slidable pressure member splined to the planetary sun gear, an armature member adjacent the pressure member rotatably mounted on the sun gear, a magnet fixed to the casing, servo means between the armature and the pressure member operative when said armature is held by the magnet to move said pressure member into plate engaging position, and yieldable means urging said pressure member in a direction releasing said brake plates from frictional engagement and said armature away from said magnet.

2. In drive mechanism having a casing, a brake sleeve fixed in the casing, drive and driven shafts in the casing and planetary gearing in the casing having a ring gear fixed to rotate with the driven shaft, a planet gear carrier fixed to the drive shaft and a sun gear loosely mounted on said drive shaft but fixed in an axial direction; control means for establishing drive through the planetary gearing comprising a series of axially shiftable brake plates alternately splined to the planetary gearing sun gear and to the casing brake sleeve, a backing member for the brake plates carried by the brake sleeve, an axially slidable pressure member splined to the sun gear, an armature member adjacent the pressure member and rotatably mounted on the sun gear, a spacer ring between the armature and the pressure member fixed to the sun gear, a magnet fixed to the casing, servo means between the armature and the pressure member, said servo means being operative when the armature is held by the magnet to engage said brake plates to hold said sun gear, and yieldable means normally urging said armature and the pressure member toward the spacer ring.

3. In drive mechanism having a casing with a brake sleeve member fixed thereto, a drive shaft and a driven shaft in the casing, planetary gearing in the casing having a planet gear carrier fixed to the drive shaft, a ring gear fixed to rotate with the driven shaft and a sun gear fixed axially and rotatable on the drive shaft, and a one-way overrunning clutch operable to drivingly connect the carrier and the driven shaft when the planetary gearing is idling; brake mechanism for establishing drive through the planetary gearing comprising a backing member fixed to the brake sleeve, a series of axially movable brake plates adjacent the backing member alternately fixed to the sleeve and to the sun gear, an axially movable pressure member fixed to rotate with the sun gear, an armature adjacent the pressure member, stop means between the pressure member and the armature, registering conical recesses in the adjacent faces of the pressure member and the armature, balls in the registering recesses engaging the armature and the pressure member, a magnet fixed in the casing adjacent the armature and adapted to hold the armature stationary when energized, means engaging the armature, means engaging the pressure member, and yieldable means cooperating with said engaging means urging said armature and the pressure member toward the stop means.

4. In drive mechanism, a casing with a longitudinally splined brake sleeve fixed to the interior thereof, a drive shaft and a driven shaft in said casing, and planetary gearing in the casing behind the brake sleeve having a ring gear fixed to rotate with the driven shaft, a planet gear carrier fixed to the drive shaft and a sun gear rotatably mounted on the drive shaft having an apertured and externally splined forward portion in line with the brake sleeve, a series of axially movable brake plates alternately engaging the splined portions of said sleeve and said sun gear, a brake backing member fixed to the sleeve behind said plates, an axially movable pressure member fixed to the sun gear in front of said plates, an armature in front of said pressure member rotatably mounted on the sun gear, a stop ring fixed on the sun gear between the armature and the pressure plate, a magnet fixed in the casing and operable to hold said armature from rotating, pins in some of the splines of the sun gear bearing against the rear face of the pressure member and projecting beyond the rear plate, a ring engaging the rear ends of said pins, a ring engaging the front face of said armature, and coil springs extending through the apertures in the sun gear, said springs being anchored at their forward ends to the armature engaging ring and at their rear ends to the pin engaging ring.

5. In drive mechanism, a casing with a longitudinally splined interior brake sleeve fixed thereto, a drive shaft and a driven shaft in said casing, planetary gearing in the casing having a planet gear carrier fixed to the drive shaft, a ring gear fixed to rotate with the driven shaft and a sun gear rotatably mounted on the drive shaft and having a forwardly extending enlarged portion externally splined, a series of brake disks alternately splined to the sleeve and sun gear extension, a brake disk backing member splined to the sleeve, a pressure member splined to the sun gear extension, an armature adjacent the pressure member, a bearing for the armature on the sun gear extension, stop means fixed on the sun gear between the armature and the pressure member, servo means between the armature and the pressure member, a magnet fixed in the casing for holding said armature from rotation, and means engaging said armature and said pressure member normally urging them against said stop means, said servo means being effective to move said pressure member axially to engage the brake disks when said magnet holds said armature.

WALTER R. GRISWOLD.